United States Patent [19]

Kocherginsky et al.

[11] 4,121,018
[45] Oct. 17, 1978

[54] POSITIVE ELECTRODE FOR AIR-DEPOLARIZED ALKALINE PRIMARY CELL WITH THICKENED ELECTROLYTE

[76] Inventors: Meer Danilovich Kocherginsky, ulitsa Komarova, 6, kv. 23; Lidia Fedorovna Penkova, ulitsa 3 Mytischinskaya, 14a, kv. 124; Viktor Arsenievich Naumenko, ulitsa Novo-Alexeevskaya, 48, korpus 37, kv. 28, all of Moscow, U.S.S.R.

[21] Appl. No.: 712,505

[22] Filed: Aug. 9, 1976

[51] Int. Cl.$^2$ ............................................. H01M 12/06
[52] U.S. Cl. ....................................... 429/27; 429/224
[58] Field of Search .................................. 429/27, 224

[56] References Cited
U.S. PATENT DOCUMENTS

| | | |
|---|---|---|
| 1,760,090 | 5/1930 | Staley ..................................... 429/224 |
| 1,899,615 | 2/1933 | Heise ....................................... 429/27 |
| 3,242,013 | 3/1966 | Mehne et al. ......................... 429/224 |
| 3,716,411 | 2/1973 | Ogawa .................................... 429/224 |
| 3,902,922 | 9/1975 | Kis .......................................... 429/224 |

Primary Examiner—Anthony Skapars
Attorney, Agent, or Firm—Lackenbach, Lilling & Siegel

[57] ABSTRACT

A positive electrode for an air-depolarized alkaline primary cell comprising a catalyst for reduction of air oxygen, which catalyst is manganese dioxide, as well as carbon and a hydroxide solution of potassium, and is characterized, according to the invention, in that said catalyst is electrolytic or synthetic manganese dioxide of γ-modification.

The positive electrode of this invention can be employed in cylindrical and disc-type cells and alkaline electrolyte batteries.

3 Claims, 1 Drawing Figure

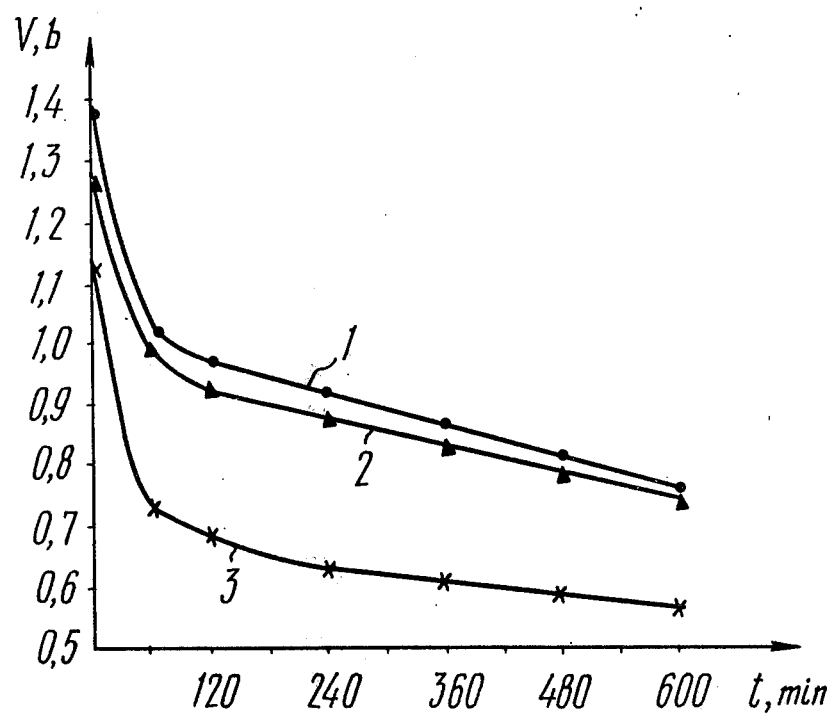

POSITIVE ELECTRODE FOR AIR-DEPOLARIZED ALKALINE PRIMARY CELL WITH THICKENED ELECTROLYTE

The present invention relates to primary alkaline cells intended for conversion of chemical energy into electric energy and, more particularly, to a positive electrode for an air-depolarized alkaline primary cell with thickened electrolyte.

The electrochemical reaction which takes place in air-depolarized cells with thickened electrolyte and an anode of zinc is well known. In fact, it may be called electrochemical "burning" of zinc according to this equation:

$$2Zn + O_2 \rightarrow 2ZnO \tag{1}$$

As the cell is discharging, air oxygen is adsorbed by the cathode and ionized on the three-phase catalyst-electrolyte-gas boundary. In order to accelerate the processes of adsorption and ionization of oxygen, use is made of catalysts comprising different elements, alloys and oxides or their mixtures.

There are known two types of positive air-depolarized electrodes used in cells with thickened electrolyte. In the first type, the developed three-phase catalyst-electrolyte-gas boundary, which is necessary for the oxygen ionization process, is produced by rendering catalyst particles hydrophobic, for example, with the aid of polytetrafluoroethylene. Using a hydrophobic catalyst is applied onto a thin porous diaphragm of polytetrafluoroethylene (fluorineplastic), through which air oxygen diffuses into the reaction zone, the diaphragm plays the role of a layer which prevents the penetration of the electrolyte to the gas side of the electrode.

Cells employing hydrophobic electrodes on the basis of fluorineplastic have a high specific energy (up to 250 watt-hours per kilogram) and can operate at current densities of up to 50 ma/cm². Yet such cells have an important drawback which resides in that their capacity is reduced after long intermittent discharges. The storage life of such cells in the usable condition, i.e. without a sealed case, is limited and is about only 3 to 4 months. The cause of reducing the cell's capacity after long discharges and in the course of storage is the penetration of air through the thin porous diaphragm to the thickened electrolyte, its subsequent carbonization and oxidation of the zinc by air oxygen. Another disadvantage of cells with hydrophobic electrodes is their comparatively high price which, in turn, is due to high prices of the catalysts and fluorineplastic.

There are also known positive air electrodes, wherein the three-phase catalyst-electrolyte-gas boundary is produced by impregnating the cathodes with a limited quantity of electrolyte. In this case the electrodes do not have to be rendered hydrophobic. USSR Inventor's Certificate no 117,837 describes a hydrophilic air electrode which comprises an oxygen reduction catalyst in the form of manganese which comprises an oxygen reduction catalyst in the form of manganese ore ($MnO_2$ of $\beta$-modification), carbon and an alkaline solution. The use of this type of electrode in air-depolarized cells with thickened alkaline electrolyte ensures a specific energy of up to 250 watt-hours per kilogramme. Yet such electrodes can only operate at current densities of not more than 5 ma/cm².

It is an object of the present invention to provide a positive air-depolarized electrode with thickened electrolyte, wherein the catalyst is manganese dioxide of $\gamma$-modification and which can operate at elevated current densities.

It is another object of the invention to provide cells with the novel positive electrode, which cells have improved storage life and further retain their capacity after long intermittent discharges.

It is still another object of the invention to provide inexpensive positive air electrodes whose manufacture does not require any noble metals or scarce and costly materials.

The foregoing and other objects of the invention are attained by providing a positive electrode for an air-depolarized alkaline primary cell with thickned electrolyte, comprising an air oxygen reduction catalyst in the form of manganese dioxide, as well as carbon and an alkaline solution, in which electrode the catalyst, according to the invention, is electrolytic or synthetic manganese dioxide of $\gamma$-modification.

In order to manufacture the proposed type of electrode, it is expedient that use should be made of mass with the following content of the above-mentioned ingredients in terms of percentage by weight:

| | |
|---|---|
| electrolytic or synthetic manganese dioxide ($MnO_2$) of $\gamma$-modification | 33 to 67 |
| carbon | 12 to 40 |
| potassium hydroxide solution | 20 to 28. |

In order to reduce the cost of the electrode, the latter can be manufactured from a mass containing an addition of manganese ore, the ratio between the ingredients, in terms of percentage by weight, being as follows:

| | |
|---|---|
| electrolytic or synthetic manganese dioxide of $\gamma$-modification, | 16 to 33 |
| manganese ore | 17 to 34 |
| carbon | 12 to 40 |
| potassium hydroxide solution | 20 to 28. |

It is desirable that the electrode's porosity should be 8.5 to 40 percent.

The present invention is based upon the discovery of the following effect. In the course of a discharge of a positive electrode comprising electrolytic or synthetic manganese dioxide of $\gamma$-modification, and when there is an access of air oxygen to the electrode, the electrode's potential is first rapidly reduced, but then is stabilized at 1.1 V (measured against a zinc reference electrode). In the course of a discharge of such electrodes, oxygen regeneration has been found to take place, as shown in the following equation:

$$4MnO(OH) + O_2 \rightarrow 4MnO_2 = 2H_2O \tag{2}$$

The discharge voltage of alkaline cells incorporating an electrode of the present invention is on the average 0.25 V higher than that of cells wherein manganese ore ($MnO_2$) of $\beta$-modification is used as the catalyst.

In addition, freshly manufactured cells of the proposed type have an increased capacity which amounts to 2,400 minutes. They have a longer storage life and are effective despite long intermittent discharges.

The positive electrode of the present invention can be used in cylindrical and disc-type cells and batteries.

Other objects and advantages of the invention will be better understood from the following examples taken with reference to the accompanying drawing which shows three discharge curves.

EXAMPLE 1

There were manufactured three versions of a cell of the R6 type (the designation is given in accordance with the standards of the International Electrotechnical Commision), having a diameter of 14 mm and a height of 49 mm.

In the first cell, the positive electrode was made from mass with the following ratio of its ingredients in terms of percentage by weight:

| electrolytic manganese dioxide ($MnO_2$) of $\gamma$-modification | 67 |
|---|---|
| acetylene black | 12,7 |
| potassium hydroxide solution with density of 1.5 | 20.3. |

In the electrolyte of the second cell, the ratio of the ingredients of the positive electrode, in terms of percentage by weight, was as follows:

| electrolytic manganese dioxide of $\gamma$-modification | 33 |
|---|---|
| acetylene black | 15 |
| activated carbon | 25 |
| potassium hydroxide solution, density 1.5 | 27. |

In the third (control) cell, the positive electrode was made from conventional mass with the following ratio between the ingredients, in terms of percentage by weight:

| manganese ore | 33 |
|---|---|
| acetylene black | 15 |
| activated carbon | 25 |
| potassium hydroxide solution, density 1.5 | 27. |

The taps of the positive electrode were made of nickel-plated steel.

The negative electrode was made from powdered zinc. The electrolyte was thickened with starch and flour.

When discharging, the positive electrodes were in communication with air.

The cells were discharged into a 5-ohm fixed resistor during 10 minutes every day. The current density at the positive electrode was 20 ma/cm$^2$. The discharge curves are shown in the attached drawing. Curves 1, 2 and 3 are representative of the first, second and third cell versions, respectively.

The discharge curves show that the use of electrolytic manganese dioxide as the air oxygen reduction catalyst raises the mean discharge voltage by about 0.25 V, as compared to cells with manganese ore ($MnO_2$ of $\beta$-modification). As a result, the catalyst of electrolytic manganese dioxide provides for a 600-minute discharge of 0.75 V, as compared to 50 minutes in the case of control cells with manganese ore. Measurements of the positive electrode potential of the cells with electrolytic manganese dioxide showed that in the course of a discharge, the electrode potential was never less than 1.1 V, i.e. in the presence of air oxygen there takes place insignificant reduction of the electrolytic manganese dioxide.

EXAMPLE 2

Batteries of the 3R 12 type (the designation is given in accordance with the standards of the International Electrotechnical Commission), each composed of three cells, were produced. The batteries were composed of disc-type cells according to U.S. Pat. No. 3,607,429 of Sept. 21, 1971). The composition of the positive electrode was as that of Example 1 (first cell version). The porosity of the positive electrode was 8.5 percent. The batteries were discharged into a 15-ohm fixed resistor during 30 minutes a day. The cut-off (end-point) voltage was 2.7 V. The freshly manufactured batteries worked for 2,400 minutes. After being stored for one year, the service life was as long as 2,100 minutes. Being intermittently discharged during 10 minutes a day to each a cut-off (end-point) voltage of 2.7 V, the batteries had worked for 1,800 minutes. It may be noted for the sake of comparison that the best batteries of the 3R 12 type employed at present and using salt electrolyte have a service life of 600 minutes. This example shows that the proposed low-porosity positive electrode reliably protects the thickened alkaline electrolyte from carbonization and prevents the penetration of air oxygen to the zinc over a prolonged period of time.

EXAMPLE 3

Batteries of the 3R 12 type were produced. The mass of the positive electrode was of the following composition, in terms of percentage by weight:

| electrolytic manganese dioxide of $\gamma$-modification | 33 |
|---|---|
| manganese ore (from the Caucasus manganese ore deposit) | 34 |
| acetylene black | 12.7 |
| potassium hydroxide solution, density, 1.5 | 20.3. |

The batteries were discharged into a 15-ohm fixed resistor during 30 minutes a day to reach a cut-off (end-point) voltage of 2.25 V. As in Example 2, the service life of the batteries amounted to 2,400 minutes, yet the mean discharge voltage of these batteries was lower by 0.20 V, as compared to Example 2.

EXAMPLE 4

Cells of the R20 type (the designation is given in accordance with the standards of the International Electrotechnical Commission) were produced. The positive electrodes were made of the mass of Example 1 (first cell version). Being discharged into a 5-ohm fixed resistor during 30 minutes a day, the cells had a capacity of 25 ampere-hours, which is 5 times as high as that of cells with salt electrolyte, and 2 times as high as that of sealed manganese-zinc alkaline cells.

The positive electrodes used in these cells are of low porosity (8.5 percent), so ionization of oxygen in the cells occurs as in the equation:

$$4MnO(OH) + O_2 \rightarrow 4MnO_2 + 2H_2O \qquad (2)$$

EXAMPLE 5

Batteries of the 6F 22 type (the designation is given in accordance with the standards of the International Electrotechnical Commission) were manufactured, each being composed of six series connected disc-type cells. The composition of the positive electrode was as that of Example 1 (the second cell version). The porosity of the electrode was 40 percent. When discharged into a 900-ohm resistor during 4 hours a day to reach a cut-off (end-point) voltage of 5.4 V, the batteries are operable for 120 hours; when discharged into a 180-ohm, resistor for one hour a day, the batteries are in good working condition for 24 hours. It must be noted for comparison that the service life of the currently popular batteries with salt electrolyte is 3 to 4 times less.

What is claimed is:

1. In an air-depolarized alkaline primary cell comprising a positive electrode and a thickened electrolyte; the improvement, whereby said cell exhibits improved storage life and service life, comprises a positive electrode formed of an air oxygen reduction catalyst, carbon, and an alkaline solution; said air oxygen reduction catalyst being manganese dioxide of γ-modification, and the mass composition of said electrode, in terms of percentage by weight, is as follows:

| | |
|---|---|
| electrolytic or synthetic manganese dioxide of γ-modification | 33 to 67 |
| carbon | 12 to 40 |
| potassium hydroxide solution | 20 to 28 |

2. A positive electrode as claimed in claim 1, whose porosity is 8.5 to 40 percent.

3. A positive electrode as claimed in claim 1, including manganese ore in said mass composition, with the ratios of said electrolytic or synthetic manganese dioxide of γ-modification and said manganese ore being, respectively, in terms of percentages by weight, of from 16 to 33 and from 17 to 34, and with the weight percent of the other ingredients remaining the same.